United States Patent
Taha et al.

(10) Patent No.: US 8,713,260 B2
(45) Date of Patent: Apr. 29, 2014

(54) ADAPTIVE BLOCK PRE-FETCHING METHOD AND SYSTEM

(75) Inventors: Nadim Taha, Hillsboro, OR (US); Hormuzd Khosravi, Portland, OR (US)

(73) Assignee: Intel Corporation, Santa Clara, CA (US)

(*) Notice: Subject to any disclaimer, the term of this patent is extended or adjusted under 35 U.S.C. 154(b) by 651 days.

(21) Appl. No.: 12/753,295

(22) Filed: Apr. 2, 2010

(65) Prior Publication Data

US 2011/0246722 A1 Oct. 6, 2011

(51) Int. Cl.
*G06F 13/00* (2006.01)

(52) U.S. Cl.
USPC .................... 711/137; 711/E12.004

(58) Field of Classification Search
None
See application file for complete search history.

(56) References Cited

U.S. PATENT DOCUMENTS

| | | | |
|---|---|---|---|
| 6,195,735 B1 * | 2/2001 | Krueger et al. | 711/204 |
| 8,140,801 B2 * | 3/2012 | Arimilli et al. | 711/165 |
| 2002/0112127 A1 * | 8/2002 | Wong et al. | 711/137 |
| 2006/0082591 A1 * | 4/2006 | Emerson et al. | 345/602 |
| 2011/0173396 A1 * | 7/2011 | Sugumar et al. | 711/137 |

OTHER PUBLICATIONS

U.S. Appl. No. 12/646,692, entitled Secure Out-of-Band Storage Control, filed Dec. 23, 2009, on behalf of David A. Edwards, Hormuzd M. Khosravi, Yasser Rasheed, Divya Naidu Kolar Sunder, and Joseph E. Clark.

* cited by examiner

*Primary Examiner* — Sean D. Rossiter
(74) *Attorney, Agent, or Firm* — Blakely, Sokoloff, Taylor & Zafman LLP (57) ABSTRACT

A method and system may include fetching a first pre-fetched data block having a first length greater than the length of a first requested data block, storing the first pre-fetched data block in a cache, and then fetching a second pre-fetched data block having a second length, greater than the length of a second requested data block, if data in the second requested data block is not entirely stored in a valid part of the cache. The first and second pre-fetched data blocks may be associated with a storage device over a channel. Other embodiments are described and claimed.

19 Claims, 9 Drawing Sheets

ADAPTIVE BLOCK PRE-FETCHING METHOD AND SYSTEM

BACKGROUND

Often in business and consumer environments information technology (IT) specialists may need to access and/or manage individual users' computers, but desk-side visits can be expensive and time-consuming. IT specialists may thus remotely access or control users' computers and access storage devices.

BRIEF DESCRIPTION OF THE DRAWINGS

The subject matter disclosed in this application is particularly pointed out and distinctly claimed in the concluding portion of the specification. Embodiments of the invention, however, both as to organization and method of operation, together with objects, features, and advantages thereof, may best be understood by reference to the following detailed description when read with the accompanied drawings in which:

It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission, or display devices. In addition, the term "plurality" may be used throughout the specification to describe two or more components, devices, elements, parameters, and the like.

Embodiments of the present invention may be used in a variety of applications that may require remote access. Although the present invention is not limited in this respect, the circuits and techniques disclosed herein may be used in many apparatuses such as mainframe, server, and personal computers (PCs), wireless devices or stations, communication systems such as set-top boxes, and the like.

Remote access can save IT specialists time and money as compared to personally visiting their clients' desks. In some instances, IT specialists are not in the same location as their clients, and therefore personal visits may be difficult at best, and impossible at worst, for example, if the IT specialist's tasks are assumed by outsourced individuals in foreign countries. In this specification, IT specialists may be employed by a business, and the clients may also be employed by the business. IT specialists may also be independent consultants who act as their clients' "helpdesk" or system administrator. Such consultants also include commercial IT service specialists, like NerdsToGo® and Best Buy's "Geek Squad®," who provide remote IT services for consumers and businesses.

One way of providing remote access may be via software on the IT server and/or client's computers. Such access may be provided via a LAN (local area network) or WAN (wide area network), such as the Internet. This is often called "in-band" management, and may be provided via a client computer's data port. In some cases, remote access may be provided "out-of-band" (OOB), that is, via a client computer's service port (or data port configured as a service port). Because access is via a different channel, out-of-band management can be provided even if the client's computer is powered-down or powered-off, or its operating system is hung up, has been compromised, or is not installed. It can operate independently of the client's main CPU (central processing unit) and independently of the client's operating system state. Hardware in the form of a remote access card (RAC) or chip or chipset that may be installed in a client's computer may facilitate this type of remote access. Such a RAC or chipset may include its own processor, memory, network connection, access to the system bus, and battery.

Figure 1A:
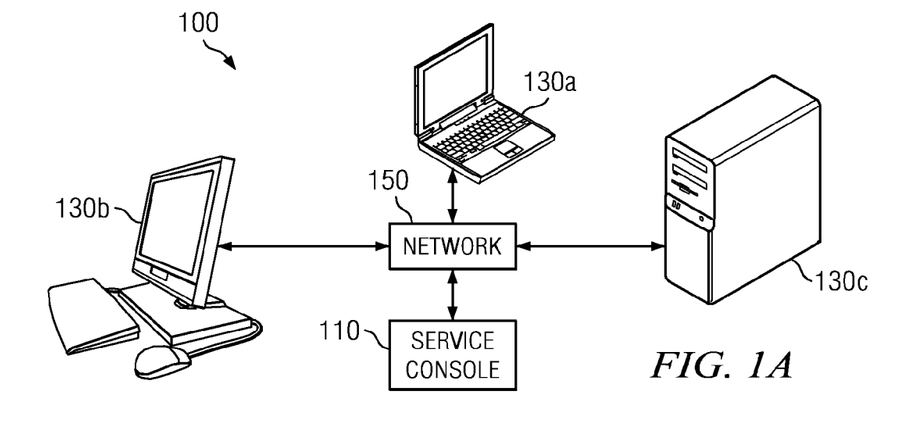
FIGS. 1A and 1B are conceptual illustrations of a computer network according to embodiments of the invention.

Reference is now made to FIG. 1A, a conceptual illustration of a computer network 100 operating according to embodiments of the invention. Computer network 100 may be a wired (e.g., Ethernet) or wireless network, a LAN, a WAN, or a wireless local area or wide area network.

Although the invention is not limited in this respect, computer network 100 may include service console (or server computer) 110 and client computers 130 (or 130a, 130b, 130c) that are capable of communicating with each other via network or channel 150. Examples of service console 110 may be a mainframe computer, a desktop or laptop computer, or other computers that can be used by a remote IT specialist. Examples of client computers 130 may be a laptop 130a, a desktop 130b, or tower computer 130c. Client computer 130 could also be, for example, a cable-TV set-top box. Computer network 100 may include more than three client computers 130, but three are shown for simplicity. Generally, service console 110 can remotely access client computers 130. An out-of-band management channel may be implemented as a connection between service console 110, network or channel 150, and client computer 130.

Generally, embodiments of the invention allow IT specialists to use software located on service console 110 to remotely service client 130. One task of such software may be for service console 110 to remotely access and manage client 130's data storage, such as for re-imaging, troubleshooting, or reading, writing, or copying files. Within the task of remote storage access, a process has been developed to improve the speed of mounting and operating a client's storage device during remote storage access.

Figure 1B:
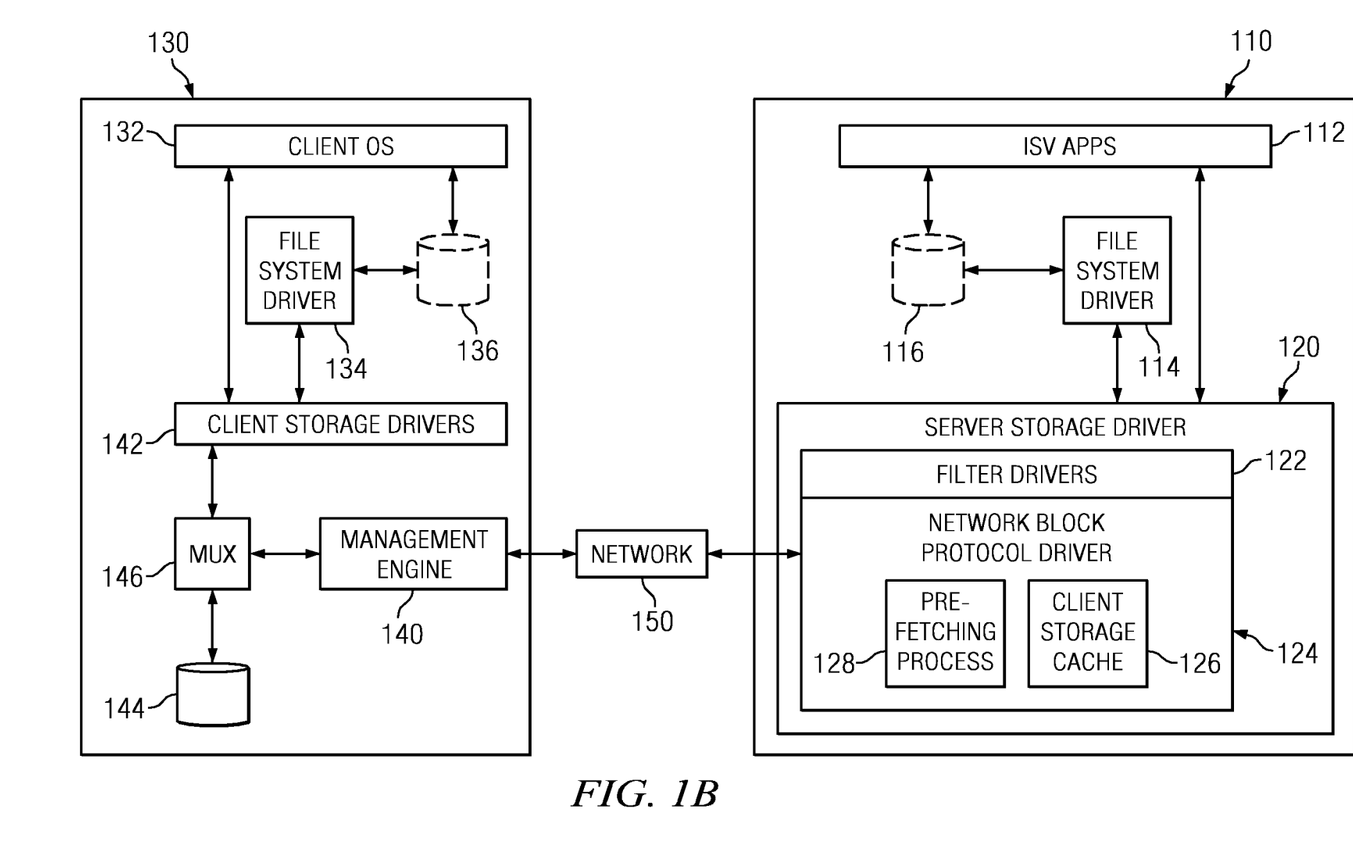

FIG. 1B is a more detailed illustration of computer network 100. Within service console 110 are several functional blocks, including independent software vendor (ISV) applications 112, file system driver 114, client volume object 116, and server storage driver 120.

ISV applications 112 may be applications provided by a storage, security, or management independent software vendor such as, for example, Microsoft® or Symantec®. In this embodiment, ISV applications 112 may be related to the IT specialist's remote management tasks, such as remotely setting up computers, downloading software updates, performing asset inventories, data recovery, online break-fix, system re-imaging, and other IT services. Microsoft SCCM (System Center Configuration Manager) and Symantec Altiris may be examples of such ISV applications 112 that may provide one or more of these services.

A file system is a method of storing and organizing computer files and the data they contain to make it easy to find and access them. A file system may include a hierarchy of directories (directory tree). File systems may be linked to specific operating systems such as Microsoft Windows and Linux. Examples of file systems may be FAT (file allocation table) and NTFS (new technology file system) used under Microsoft Windows, and EXT and other systems used under Linux. File system driver 114 may interpret the file system used by client computer 130 to present client volume object 116 to ISV application 112.

Server storage driver 120 may be a driver program that manages secondary storage devices (such as hard drives) physically located in client computers 130, making them appear as local storage devices to the operating system running on service console 110. Server storage driver 120 may interact with management engine 140 in client computer 130 and may include filter drivers 122 and network block protocol driver 124. Filter drivers 122 may provide security and redundancy services and may include SW RAID (software-based Redundant Array of Inexpensive Disks) drivers and/or SW FDE (software-based Full Disk Encryption) drivers. RAID helps protect client computers against data loss in the event of a storage device failure and may improve the performance of disk intensive applications. SW FDE is a method of securing storage device data in case of theft. Server storage driver 120, filter drivers 122, and network block protocol driver 124 may be implemented and stored in a computer or processor readable format on a computer or processor readable storage medium, such as, for example, a ROM or RAM, a mechanical disk drive, or a solid-state drive (e.g., a USB flash drive).

Client storage cache 126, which may be a separate physical memory or may reside in the main memory of service console 110, may contain data present in an area of a storage device, and may be related to network block protocol driver 124, as will be described further below.

Filter drivers 122 emulate the upper part of the stack of client storage drivers 142 on client computer 130 and may interact with network block protocol driver 124, which may include software logic to request and relay data blocks from storage device 144 in client computer 130. As mentioned above, network block protocol driver 124 includes techniques to improve the speed of mounting and operating a client's storage device during remote storage access. Mounting a storage device (or, more generally, mounting a volume) may be a process of making a file system ready for use by the operating system, typically by reading certain index data structures from storage into memory ahead of time. (The term hearkens back to the time when an operator had to physically place or mount a magnetic tape or hard disk on a spindle before using it.) In Microsoft Windows, the equivalent to "mounting a volume" is known as "mapping a drive." In the case of this specification, mounting a volume makes the file system ready to be used by the remote management software, ISV applications 112.

Within client computer 130 are several functional blocks, including client operating system (OS) 132, file system driver 134, client volume object 136, client storage drivers 142, management engine 140, storage device 144, and multiplexer (MUX) 146.

Client OS 132 may be any operating system, but typical operating systems are Microsoft Windows and Linux. The actual client OS is not critical, since embodiments of the invention operate independently of client OS 132, as will be shown further below. The file system on client computer 130 may be interpreted by service console 110, the driver instance being represented as file system driver 114. Client service drivers 142 are also emulated by service console 110 and are functionally the same as server storage driver 120.

Management engine 140 (sometimes called "manageability engine") may be a hardware and firmware/software combination residing on client computer 130. The hardware part of management engine 140 may include a processor, memory, and maybe a battery, and may also include a network connection and access to the system bus. An example of management engine 140 is Intel®'s Management Engine. The firmware/software part of management engine 140 may include drivers and tools supporting local OS access to the hardware management features. Intel®'s AMT (Active Management Technology) is an example of such management engine firmware/software. Intel®'s Management Engine is part of a chipset for Intel® vPro™ platforms, which is one embodiment of a remote management technology.

Storage device 144 may be where the data on client computer 130 actually resides. MUX 146 may be used to distribute data from storage device 144 both to client computer 130 and to management engine 140, for eventual transfer to service console 110 over network or channel 150. Storage device 144 may be a computer or processor readable and possibly writable storage medium, such as, for example, a ROM or RAM, a mechanical disk drive, or a solid-state drive (e.g., a USB flash drive).

In operation, network block protocol driver 124 may implement an adaptive pre-fetching process 128 that can improve the throughput for OOB storage management technologies, especially in high latency, high bandwidth networks such as the Internet. On client computer 130, management engine 140 provides OOB access to storage device 144 using MUX 146 that may be part of the chipset hardware. On service console 110, adaptive pre-fetching process 128 may be implemented as part of server storage driver 120, which may be responsible for OOB communication with the client platform to fetch storage data based on the requests made by the rest of the storage/file system software stack on the server.

In order to understand pre-fetching process 128, one should be familiar with a number of concepts. A conventional process for mounting a volume or operating a client's remote storage device makes a series of requests for small blocks of data with a strong locality of reference. For example, when mounting a volume, Microsoft® Windows makes a number of relatively small (typically 4 KB (kilobytes) long), contiguous requests to the volume or storage device to process the file system metadata. A block may be identified by an offset from the storage device's origin and a length.

Figure 2A:
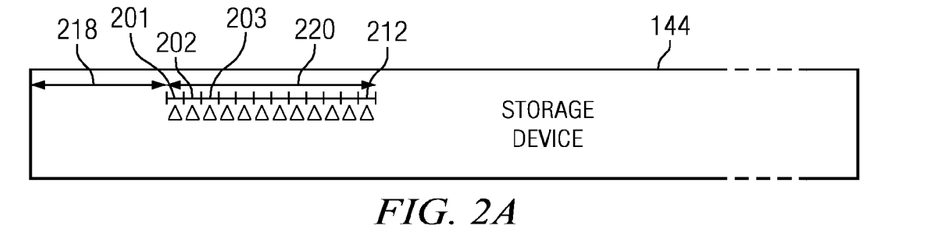
FIGS. 2A and 2B are conceptual illustrations of a computer storage device such as a disk drive according to embodiments of the invention.

Reference is now made to FIG. 2A, which is a conceptual illustration of storage device 144 according to embodiments of the invention. This figure shows how blocks of data on the storage device may be requested. To request block 201, for example, one may specify offset 218 and the length of block 201, which may be $\Delta KB$. In order to access the 12 blocks 201-212 each of length $\Delta KB$, a conventional system might make 12 successive requests for blocks of length $\Delta KB$, successively incrementing the offset by $\Delta KB$ on each request. If the requests are made to client computer 130 from service console 110 over network or channel 150 that might exhibit a round-trip time (RTT) latency on the order of 100 ms (but has ample bandwidth), the time to retrieve all 12 blocks 201-212 may be on the order of 1.2 seconds. For simplicity and clarity of illustration, $\Delta T$, the time associated with the actual data transfer (once the first byte has been received) is assumed to be negligible throughout this specification. $\Delta T$ can be calculated by dividing the transmission size by the communication channel's bandwidth. In that scenario, assuming a 4 KB block size and a 30 Mbps (megabit per second) communication channel (which is not uncommon for consumer broadband connections in some countries), $\Delta T$ would be on the order of 12.5 ms (0.0125 seconds).

The network through which service console 110 connects to client computer 130 may be considered a "high latency" network. Such networks may include the Internet, some intranets, some WANs, MANs (metropolitan area networks), or even LANs. Other connections may be considered "low latency," possibly on the order of 1 ms or less, and may include some LANs and interconnects used in high performance computing (e.g., InfiniBand, Myrinet). It will be appreciated that "high latency" and "low latency" are relative terms, and there is a gamut of communication channel and storage device data access latencies. Benefits of the present invention generally increase as latency for single data accesses increases, but benefits of the invention can be seen in low-latency environments for particular workloads.

In some storage access situations, contiguous blocks of data are often requested. If, based on access history or other considerations, it is anticipated that such contiguous blocks of data may be requested, it may be beneficial to retrieve a larger contiguous block when a smaller one is first requested, in order to eliminate later latencies associated with retrieving contiguous, small blocks.

Using the example shown in FIG. 2A, when block 201 is requested, instead of retrieving only block 201, pre-fetch block 220, comprising 12 smaller blocks 201-212, may be retrieved or pre-fetched. Access latency for pre-fetch block 220 is the same as that for block 201 (~100 ms). Then, if the remote service application requests block 202, that block has already been retrieved and can be served with near-zero latency. If the remote service application separately requests blocks 203-212, those blocks, having already been retrieved during the pre-fetch action, can also be served with near-zero latency. Thus, the time to retrieve all 12 blocks 201-212 has been reduced to approximately 100 ms, which is about $\frac{1}{12}$ the latency compared to the previous scenario.

This process of pre-fetching blocks of data can be made adaptive, that is, the amount of pre-fetched data may be conditioned on past successes predicting how much data can be pre-fetched (e.g., how large a block of pre-fetched data to use). In the previous example, a block of 12 $\Delta KB$ (so-called "pre-fetch buffer length") was chosen. But if it turns out that, for example, 26 $\Delta KB$ of contiguous data have been requested by the remote application, the pre-fetch buffer length could be increased to 26 $\Delta KB$. Similarly, if it turns out that, for example, only 6 $\Delta KB$ contiguous data blocks out of 12 $\Delta KB$-long blocks have been used, the pre-fetch buffer length could be decreased to 6 $\Delta KB$.

Figure 2B:
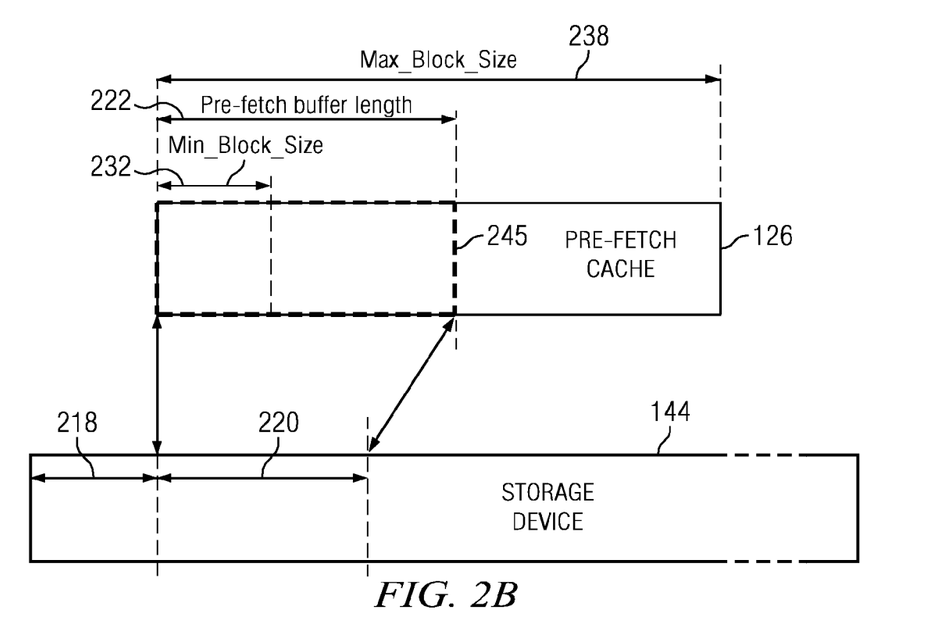

Reference is now made to FIG. 2B, which shows storage device 144 according to embodiments of the invention. The bottom of FIG. 2B is the same as FIG. 2A and shows offset 218, which can also be called a "pre-fetch buffer offset," and pre-fetch block 220, which has pre-fetch buffer length 222. As can be seen in the top of FIG. 2B, pre-fetch block 220 may be stored in client storage cache 126 (also referred to as pre-fetch cache 126). The valid portion of pre-fetch cache 126 (the part storing the pre-fetched data block) may be pre-fetch buffer 245. In embodiments of the invention, as described above, the length of the pre-fetch buffer may be varied adaptively in order to maximize hits within the pre-fetch buffer. The length of the pre-fetch buffer may range from min_block_size 232 to max_block_size 238, which is the same as the length of pre-fetch cache 126. Examples of these values are 64 KB for min_block_size 232 and 4 MB (megabytes) for max_block_size 238. Note, however, that these values do not limit the invention in any way. If the maximum block length requested by the operating system is 4 KB, max_block_size could be any length over 4 KB. The only limit on max_block_size is how big a pre-fetch cache the service console 110 wants to dedicate to this task. The quantity min_block_size could be any length between the smallest device addressable unit and max_block_size. For the sake of simplicity, at this point we assume min_block_size is greater than or equal to the maximum request length the operating system would make. Later, a more generalized value for min_block_size is discussed.

In general, the pre-fetching process may include several operations. The length of the pre-fetch buffer may begin at some value, for example, min_block_size. If subsequent requests from the operating system for data blocks result in hits to the pre-fetch buffer (that is, the data has already been pre-fetched and is in the valid part of the pre-fetch cache), then the requested data block may be served to the operating system. If subsequent requests are not in the pre-fetch buffer (valid part of the pre-fetch cache), but fall within the pre-fetch cache, the process may increase the length of the pre-fetch buffer so that future requests would fall within that buffer. If subsequent requests are not in the pre-fetch cache, the process may, after a number of such misses, reduce the length of the pre-fetch buffer so as not to waste resources retrieving large blocks of unused data. Some optimizations to this process may be made, as will be discussed below.

Figure 3:
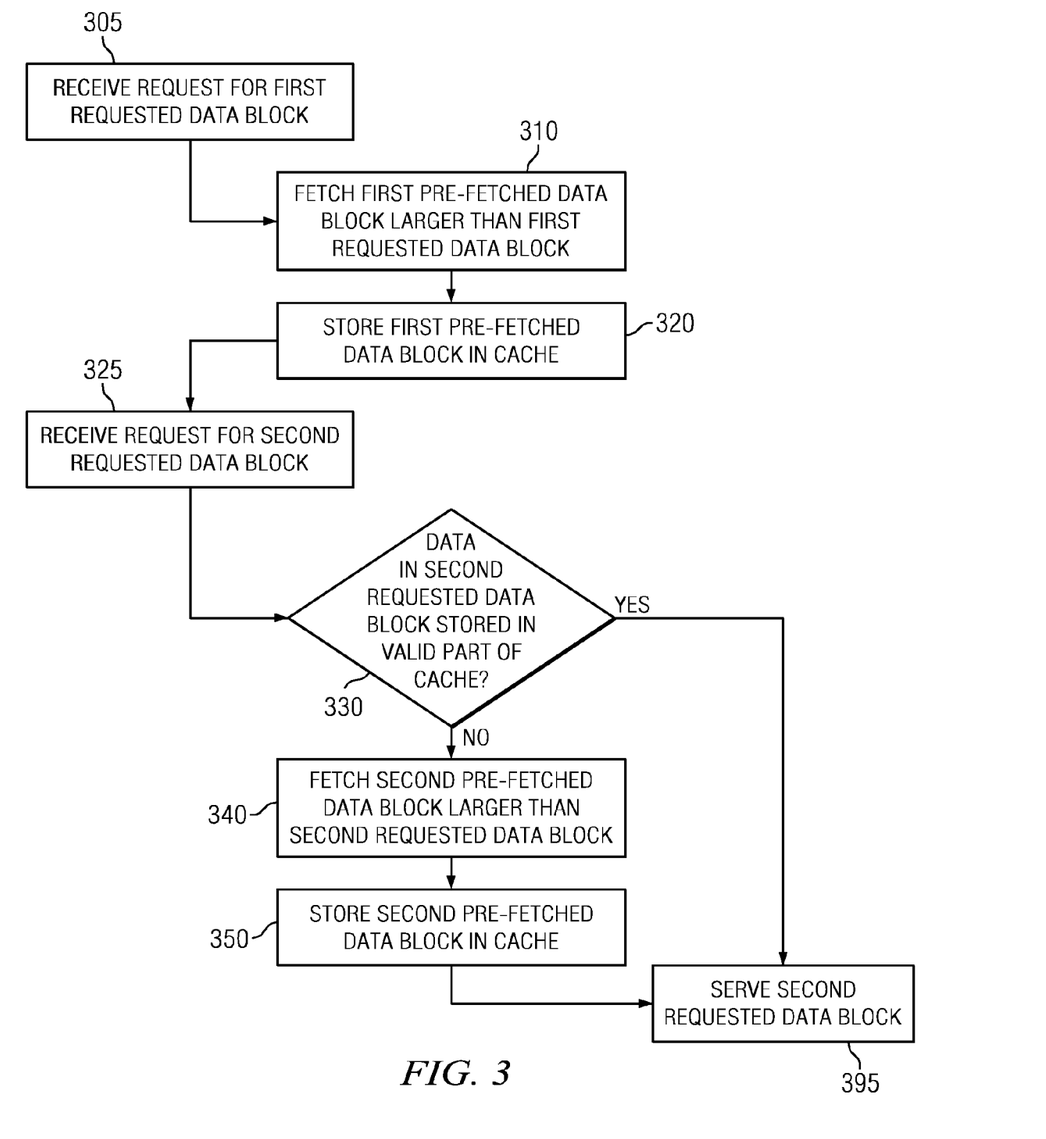
FIG. 3 is a flowchart illustrating an adaptive pre-fetching process according to embodiments of the invention.

Reference is now made to FIG. 3, which is a flowchart illustrating an adaptive pre-fetching process according to embodiments of the invention. Embodiments of the process may be used by, or may be implemented by, for example, service console 110 or other suitable systems. During an IT operation, an IT specialist may use ISV applications 112 to request access to a client's storage device 144. In response, ISV applications 112 may call server storage driver 120, which in turn may call network block protocol driver 124, which may initiate pre-fetching process 128. Pre-fetching process 128 may operate while mounting client's storage device 144 or accessing data from client's storage device 144, or a combination of the two. In operation 305, network block protocol driver 124 may receive a request for a first data block ("first requested data block"), which may have a length of 4 KB. In operation 310, pre-fetching process 128 may fetch a first data block ("first pre-fetched data block") that generally is larger (i.e., longer) than the first requested data block. In operation 320, the first pre-fetched data block, constituting pre-fetch buffer 245, may be stored in pre-fetch cache 126. Although pre-fetched data blocks may generally be larger than requested data blocks, in some instances a pre-fetched data block may be the same length as a requested data block. In some embodiments, there may be a minimum block size or length 232 and/or maximum block size or length 238 for the first and any subsequent pre-fetched data block. These values may be 64 KB to 4 MB, but could be lesser or greater depending on potential desired benefits and trade-offs. For example, the larger the first pre-fetched data block, the fewer accesses that may need to be made to the client's storage device in the future, but only if future accesses request data already in the pre-fetch buffer. On the other hand, larger pre-fetched data blocks consume more bandwidth between service console 110 and client storage device 144.

In operation 325, network block protocol driver 124 may receive a request for a second data block ("second requested data block"), which may also have a length of 4 KB. In operation 330, pre-fetching process 128 determines whether the data in this second requested data block may already be stored in the valid part of pre-fetch cache 126 (i.e., in pre-fetch buffer 245). If so, in operation 395, the second requested data block is served to the requesting entity (e.g., file system driver 114, an ISV application 112, or one of the filter drivers 122). If the second requested data block is not already stored in the valid part (pre-fetch buffer 245) of pre-fetch cache 126, the data in pre-fetch buffer 245 may be discarded (except in certain circumstances, discussed later). In operation 340, pre-fetching process 128 may fetch a second data block ("second pre-fetched data block"), generally larger than the second requested data block, and, in operation 350, the second pre-fetched data block (constituting a second pre-fetch buffer) may be stored in a pre-fetch cache. Then, the second requested data block may be served in operation 395 to file system driver 114, an ISV application 112, or one of the filter drivers 122. The second pre-fetched data block may have a length the same as or different from that of the first pre-fetched data block.

Figure 4:
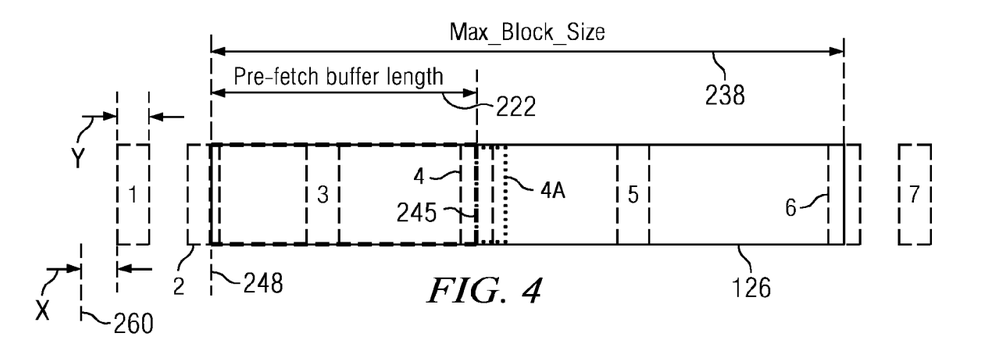
FIG. 4 is a conceptual illustration of a computer storage device such as a disk drive and various scenarios occurring during an adaptive pre-fetching process according to embodiments of the invention.

Determining the length of the second and subsequent pre-fetched data blocks may depend on different scenarios as to where the second requested data block is located in storage drive 144 as related to the pre-fetch buffer and the cache. Several of these scenarios are labeled 1 to 7 in FIG. 4, and may include:

1. The second requested data block is completely before pre-fetch buffer 245 (the leading boundary of which is buffer offset 248);
2. The tail of the second requested data block is partially within pre-fetch buffer 245;
3. The second requested data block is completely within pre-fetch buffer 245;
4. The offset of the second requested data block is within pre-fetch buffer 245, but the tail is not;
4A. The offset of the second requested data block is at the latter boundary of pre-fetch buffer 245;
5. The second requested data block is outside of pre-fetch buffer 245, but within pre-fetch cache 126;
6. The offset of the second requested data block is within pre-fetch cache 126, but the tail is not; and
7. The second requested data block falls after pre-fetch cache 126.

Figure 5:
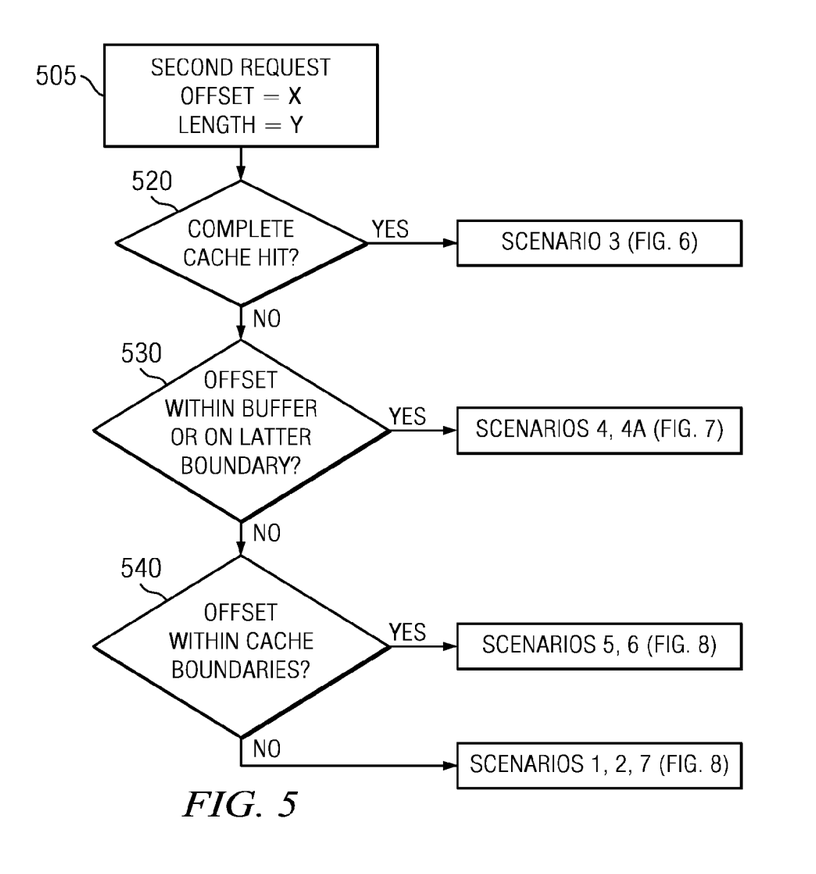
FIG. 5 is another flowchart illustrating an adaptive pre-fetching process according to embodiments of the invention.

Reference is now made to FIG. 5, which is another flowchart illustrating an adaptive pre-fetching process according to embodiments of the invention. This flowchart illustrates the scenarios described above. In operation 505, network block protocol driver 124 may receive a request for a data block having offset x and length y. As discussed earlier, a data block may be identified by an offset from the origin of client's storage device 144 and a length. In this case, the offset may be "x" and the length may be "y." In the discussion of the flowchart of FIG. 3, an example given for length y was 4 KB. These values can be explained with reference to FIG. 4. Offset x is shown as the distance from origin 260 of client storage device 144; length y is shown as the width of the data block for scenario 1.

Figure 6:
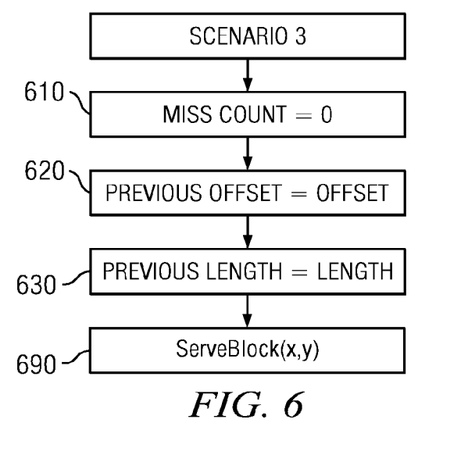
FIGS. 6-8 are flowcharts illustrating different scenarios in an adaptive pre-fetching process according to embodiments of the invention.

In operation 520, pre-fetching process 128 determines whether the second requested data block is a complete cache hit, i.e., whether the entire second requested data block is within pre-fetch buffer 245. If so, this is scenario 3, and it is further addressed in FIG. 6. Since the goal of pre-fetching process 128 is to achieve cache hits, scenario 3 is a desired result. The variable "Miss Count" may be used to keep track of the number of consecutive cache misses, so if there is a complete cache hit, Miss Count may be reset to 0, as shown in operation 610. Then in operation 620, a variable called "Previous Offset" may be set to x, the offset of the second requested data block, and in operation 630, a variable called "Previous Length" may be set to y, the length of the second requested data block. Variables Previous Offset and Previous Length may be used to handle other scenarios described later. Finally, in operation 690, ServeBlock(x,y) serves the second requested data block with offset x and length y to file system driver 114, an ISV application 112, or a filter driver 122.

Referring again to FIG. 5, if the response in operation 520 is NO, pre-fetching process 128 then determines in operation 530 whether the offset x of the second requested data block is within pre-fetch buffer 245 (i.e., whether at least some data is in the buffer) or on the latter boundary of pre-fetch buffer 245. If so, these are scenarios 4 (offset within buffer) and 4A (offset on latter boundary), and they are further addressed in FIG. 7. The variable "Hit Count" may be used as a metric of how contiguous past requests have been (it is initialized to 0). Hit Count may then be used to change the length of the pre-fetch buffer. In scenarios 4 and 4A, in operation 710, Hit Count may be incremented by 1. Operations 720 and 730 may be the same as 620 and 630.

Figure 7:
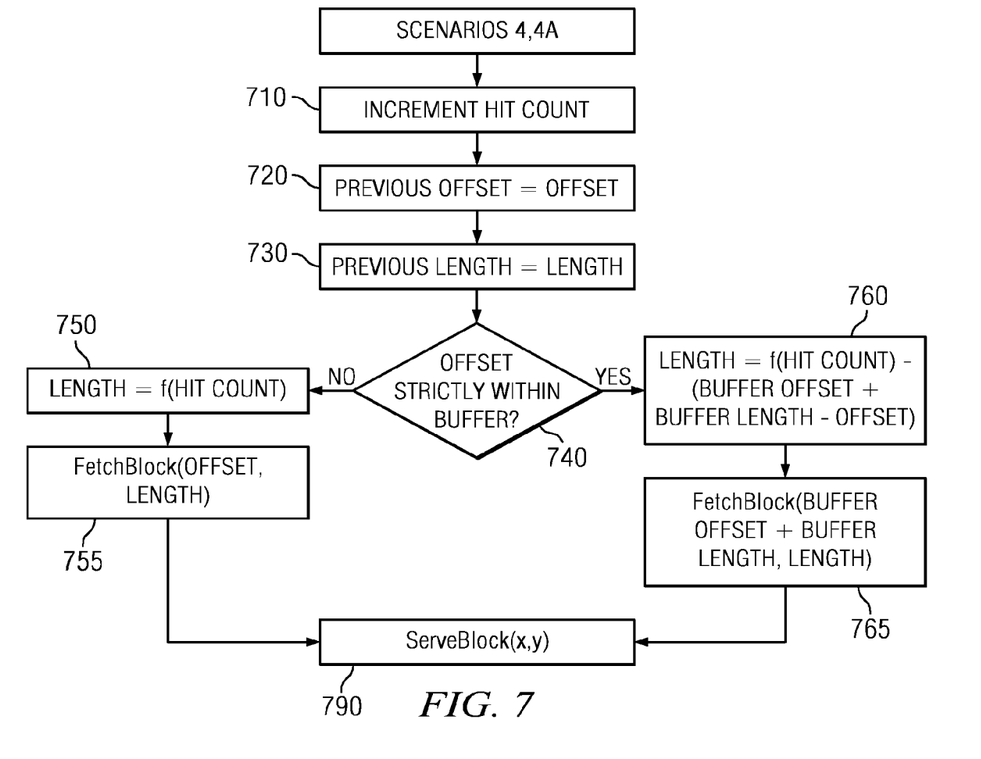

In operation 740, scenarios 4 and 4A branch apart—if the offset of the second requested data block is within the buffer, it is scenario 4 and if not, it is scenario 4A. In scenario 4A, no data from the second requested data block are actually in the buffer, but the second requested data block is just at the edge of the buffer. So the variable Length (the length of the pre-fetched data block) may be set to f(Hit Count) in operation 750. In one of the embodiments of the present invention, f(Hit Count)=Min_block_size+Min_block_size*(Hit Count). As mentioned above, the initial length of the pre-fetched data block may be min_block_size—this would be the result of f(Hit Count=0). Every time Hit Count is incremented by 1, the length of the next pre-fetched data block may increase by min_block_size, and may continue to grow (if necessary) up to max_block_size.

It will be appreciated that there are many choices for the Length function. For example, instead of the length of the next pre-fetched data block increasing by min_block_size, it could increase by 2*min_block_size or ½*min_block_size or some other multiple of min_block_size. Alternatively, it could grow by a fixed amount, say 20 KB, i.e., f(Hit Count)=min_block_size+20*(Hit Count). The variable Length could also grow by a multiple of the current length, rather than by a constant amount, e.g., f(Hit Count)= min_block_size*2^(Hit Count).

Figure 9A:
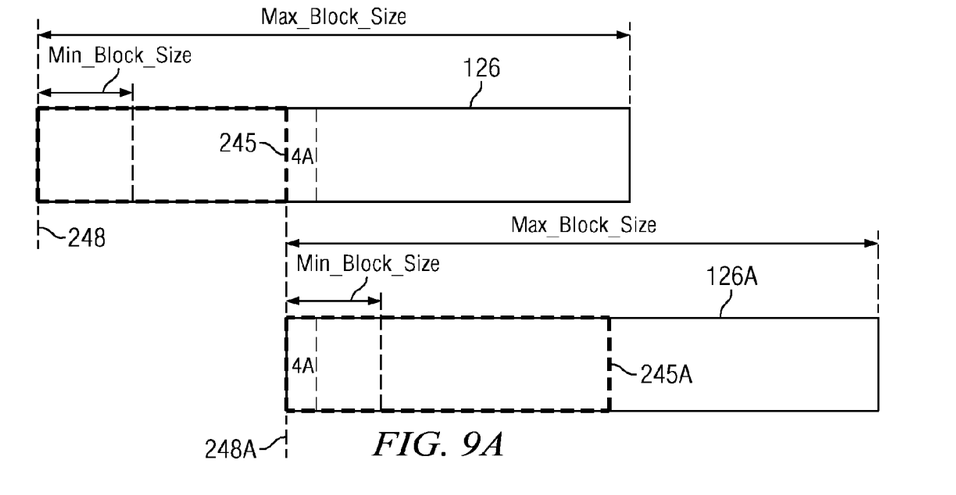
FIGS. 9A-9D are conceptual illustrations of changes in the pre-fetch buffer in an adaptive pre-fetching process according to embodiments of the invention.

Once the new buffer Length is determined, in operation 755, the new pre-fetched data block may be fetched (after clearing the cache of the current data) using FetchBlock(Offset, Length) and stored in the cache, and the pre-fetch buffer may increase in length. In this case, the starting point (or offset 248A) of the new pre-fetched data block (i.e., the new pre-fetch buffer 245A) is the end of the previous pre-fetch buffer 245 since the value of Offset is used, which is the beginning of the most recent requested data block. Thus, in this scenario, the pre-fetch buffer is both getting longer and its offset is moving through storage device 144 to anticipate the next requested data blocks. FIG. 9A shows the relationship between previous pre-fetch buffer 245, offset 248, and pre-fetch cache 126 and the new pre-fetch buffer 245A, offset 248A, and pre-fetch cache 126A for scenario 4A. In other words, the new pre-fetch buffer 245A will be stored in the "first part" of the new pre-fetch cache 126A.

In scenario 4, there may be at least some data from the second requested data block actually in the buffer, with the rest of the second requested data block outside the buffer. In this case, we may want to keep the data from the second requested data block that was in the previous buffer, but increase the length of the pre-fetch buffer and move its offset though storage device 144. So the variable Length (the length of the pre-fetched data block) may be set in operation 760 to f(Hit Count)–(buffer offset+buffer length–Offset). The amount (buffer offset+buffer length–Offset) equals the amount of the second requested data block that was in prefetch buffer 245, shown as quantity z in FIG. 9B. In operation 765, a new pre-fetched data block may be fetched (after clearing the cache of the current data except for the z length of the second requested data block that was in pre-fetch buffer 245) using FetchBlock and appended to the z length of the second requested data block that was in pre-fetch buffer 245. The offset for the appended data block is (buffer offset+buffer length), which is the end of the previous pre-fetch buffer 245. The result is a new pre-fetched data block having an offset equal to Offset (the offset of the second requested data block), and a length of f(Hit Count).

Figure 9B:
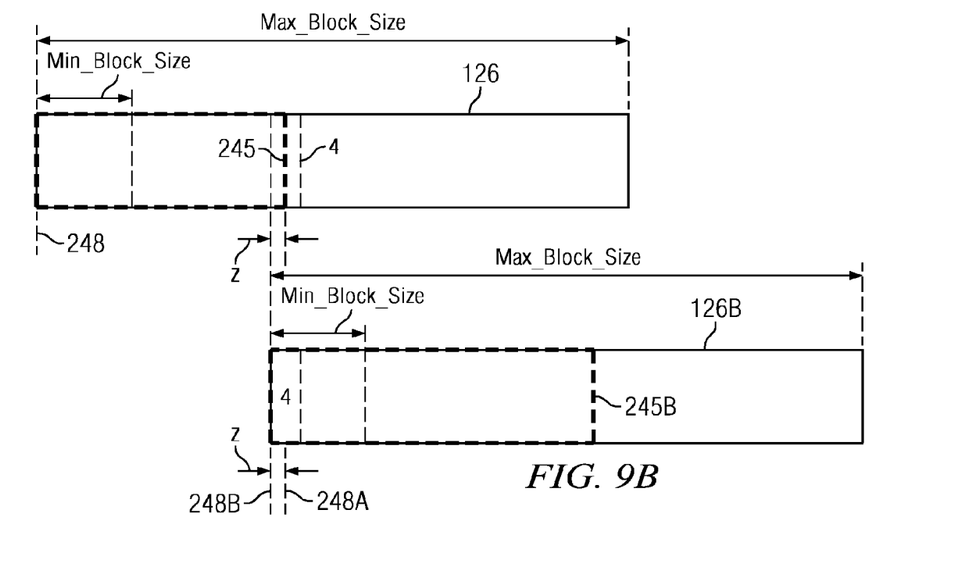

FIG. 9B shows the previous pre-fetch buffer 245, offset 248, and pre-fetch cache 126 and the new pre-fetch buffer 245B, offset 248B, and pre-fetch cache 126B for scenario 4. Pre-fetch buffer 245B has the same length as pre-fetch buffer 245A, but offset 248B is a little less than offset 248A, by the quantity z, the amount of the second requested data block that was in pre-fetch buffer 245.

To complete scenarios 4 and 4A, in operation 790, ServeBlock(x,y) may be executed, the same as operation 690, where ServeBlock(x,y) serves the second requested data block with offset x and length y to file system driver 114, an ISV application 112, or a filter driver 122 (depending on which entity requested the block).

Referring again to FIG. 5, if the response in operation 530 is NO, pre-fetching process 128 then determines in operation 540 whether the offset x of the second requested data block is within the boundaries of pre-fetch cache 126 at all, i.e., whether at least some of the second requested data block would have been in the pre-fetch buffer had the pre-fetch buffer had the length max_block_size and been extended to the full size of the cache. If so, these are scenarios 5 and 6, and they are further addressed in FIG. 8.

An adaptation resulting from scenarios 5 and 6 may be to determine whether the previous requested data block would have been present within a shorter-length pre-fetch buffer. If so, then the pre-fetch buffer length is decreased. If not, or if the pre-fetch buffer is already at the minimum size, then the length remains the same. These options are reflected in operations 810 and 815 in FIG. 8. In operation 810, the value of Hit Count is checked to see if it is greater than zero, which could mean that the length of the pre-fetch buffer is greater than min_block_size. If so, then operation 810 determines whether the previous requested data block would have been in the smaller pre-fetch buffer. (This is why operations 620/630 and 720/730 were performed, to retain the offset and length values of the previous requested data block.) If so, then in operation 815, Hit Count may be decremented by 1, and the flow goes to operation 840. If either Hit Count=0 or the previous requested data block would not have been in the smaller pre-fetch buffer, the flow goes directly to operation 840 and the length of the pre-fetch buffer remains the same.

Hit Count may be decremented to reduce the length of the pre-fetch buffer. The larger the pre-fetch buffer, the more bandwidth that may be required to pre-fetch the pre-fetched data block, and this takes extra time. Complete cache hits are good; but if there are no cache hits, as in scenarios 5 and 6, then pre-fetched data is potentially being wasted and it may be more beneficial to reduce the length of the buffer at least until there are partial cache hits, as in scenarios 4 and 4A.

Figure 8:
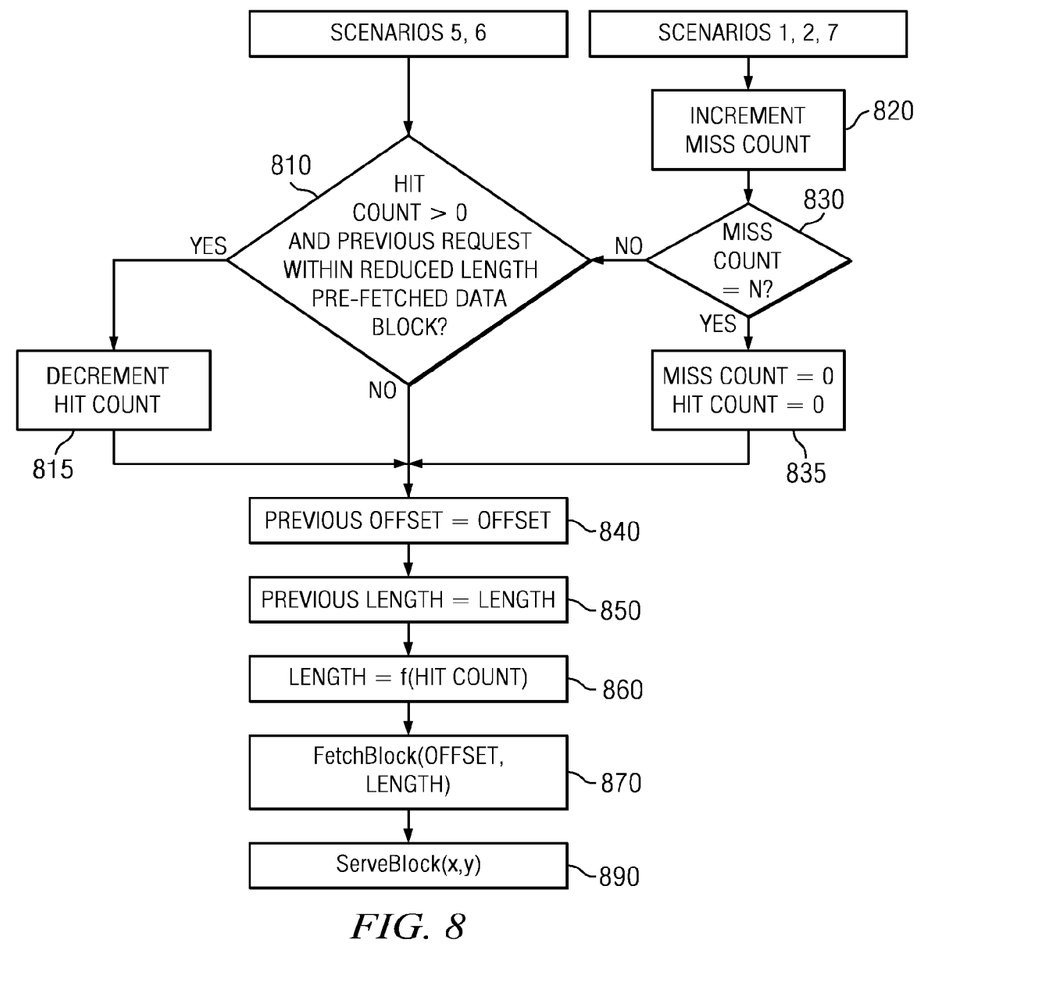

Once operations 810 and 815 are completed, Previous Offset may be set to Offset in operation 840 (the same as operations 620 and 720) and Previous Length may be set to Length in operation 850 (the same as operations 630 and 730). In operation 860, Length may be set to f(Hit Count), which may be the same value as before if at least one of the conditions in operation 810 failed, or which may be smaller if both conditions in operation 810 were true. In operation 870, FetchBlock may fetch a new pre-fetched data block that may begin at the offset of the current requested data block and may either be the same length or be smaller than the previous pre-fetched data block. Finally, in operation 890, ServeBlock(x,y) may serve the requested data block with offset x and length y to file system driver 114, an ISV application 112, or a filter driver 122, just as in operations 690 and 790.

Figure 9C:
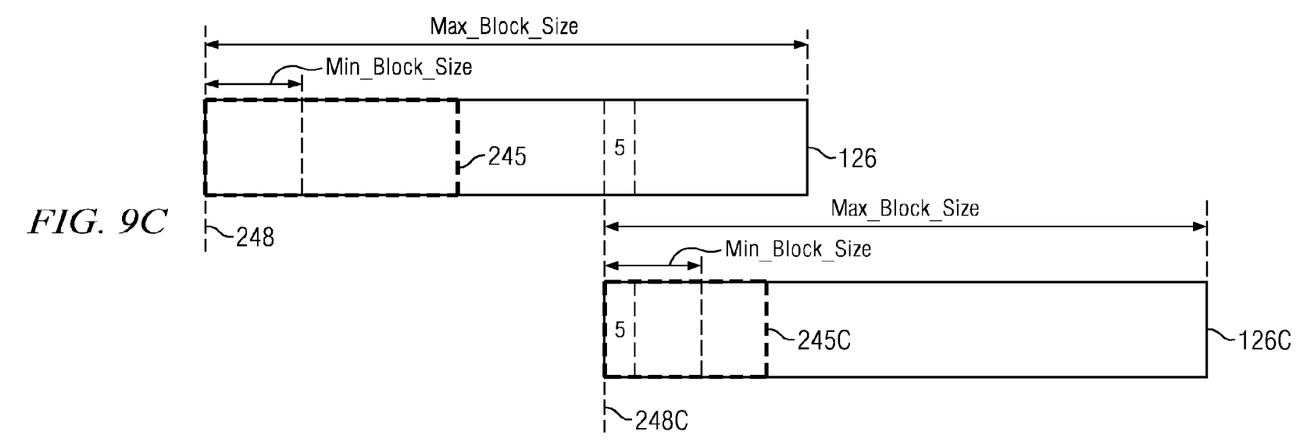

FIG. 9C shows the result if the conditions in operation 810 are true. The previous pre-fetch buffer 245, offset 248, and pre-fetch cache 126 can be compared to the new pre-fetch buffer 245C, offset 248C, and pre-fetch cache 126C for scenario 5. The length of pre-fetch buffer 245C is less than that of pre-fetch buffer 245 (by the amount min_block_size in this embodiment), and the pre-fetch buffer offset has moved through storage device 144.

Referring again to FIG. 5, if the response in operation 540 is NO, then the second requested data block could not have fallen within the buffer even if the buffer size were extended to max_block_size, which are scenarios 1, 2, and 7. These scenarios are further addressed in FIG. 8. Several procedures may take place should scenarios 1, 2, or 7 occur. One may be to increment Miss Count by 1, since the second requested data block missed the cache altogether. If there have been too many cache misses in a row, the remedy may be to reduce the pre-fetch buffer length to min_block_size and start over, thus saving bandwidth, as discussed above. Otherwise, the same checks that were performed in scenarios 5 and 6 are performed again in an attempt to decrease the length of the pre-fetch buffer by min_block_size.

Referring to FIG. 8, in operation 820, the variable Miss Count may be incremented by 1. In operation 830, it may be determined whether Miss Count equals a predetermined constant N, for example, 3. If so, then in operation 835, the variables Miss Count and Hit Count may be reset to 0 and the flow goes to operations 840 through 890 as with scenarios 5 and 6. In that case, the new pre-fetched data block has length equal to min_block_size and an offset equal to the offset of second requested data blocks 1, 2, or 7, as applicable. The predetermined constant N can be any number. If it is small, the pre-fetch buffer length will reset to min_block_size more often; if it is large, the pre-fetch buffer length may never be reset to min_block_size in these scenarios. If in operation 830, Miss Count is not equal to N, then the same operations performed in scenarios 5 and 6 may be performed, and their description will not be repeated here again.

Figure 9D:
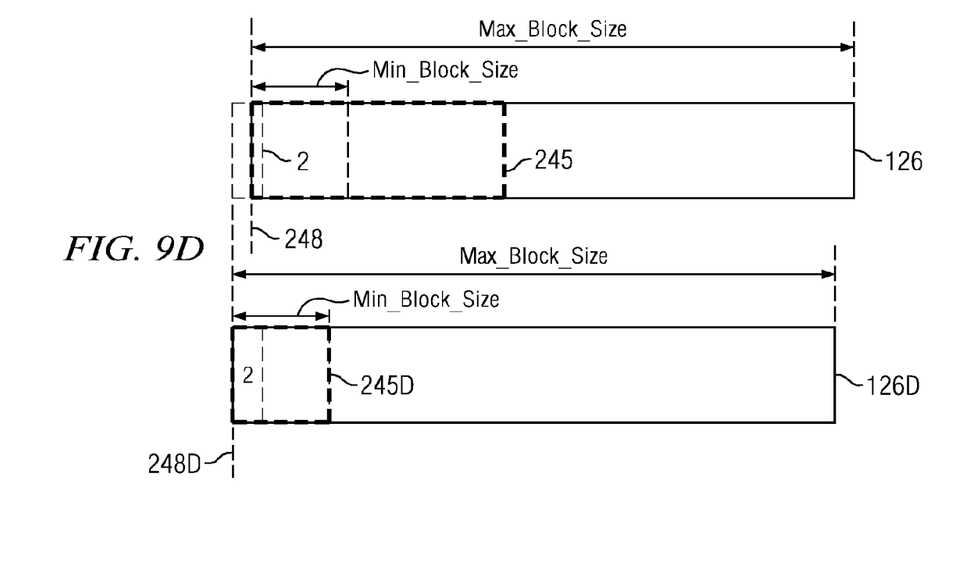

FIG. 9D shows the result if the condition in operation 830 is true for scenario 2. The previous pre-fetch buffer 245, offset 248, and pre-fetch cache 126 can be compared to the new pre-fetch buffer 245D, offset 248D, and pre-fetch cache 126D. The length of pre-fetch buffer 245D is min_block_size, and the pre-fetch buffer offset has moved backward through storage device 144 to become pre-fetch offset 248D.

Besides the flowcharts included in FIGS. 3 and 5-8, other operations or series of operations may be used. Moreover, the actual order of the operations in the flowcharts may not be critical.

Two added variables may better optimize the operation of pre-fetching process 128. A first optimization may be to add a variable called GAP_SIZE. Use of this variable may allow scenario 4A to apply (rather than scenario 5) if the offset of the second requested data block is not at the boundary of pre-fetch buffer 245, but misses pre-fetch buffer 245 by an amount less than or equal to GAP_SIZE. (Use of this variable virtually extends the buffer length by the value of GAP_SIZE.) The value of GAP_SIZE will typically be very small, for example, no larger than min_block_size and often much smaller, possibly on the order of a few KB. This may enhance performance if the read pattern corresponds to contiguous blocks that are interleaved by a small gap.

A second optimization may be to add a counter called Used_Data. This variable may keep track of how much data has been used (meaning actually requested by the operating system) from the buffer, and may operate as follows. On each cache hit (scenario 3), the length y of the requested data block may be added to the Used_Data counter. On the next miss, if the total count of bytes used were less than a Ratio (e.g., 3/4) times the pre-fetch buffer length, the Hit Count and Miss Count may be reset to zero. This may guarantee that no scenario would waste more than a fraction (depending on the ratio chosen) of the total requested data.

Figure 10:
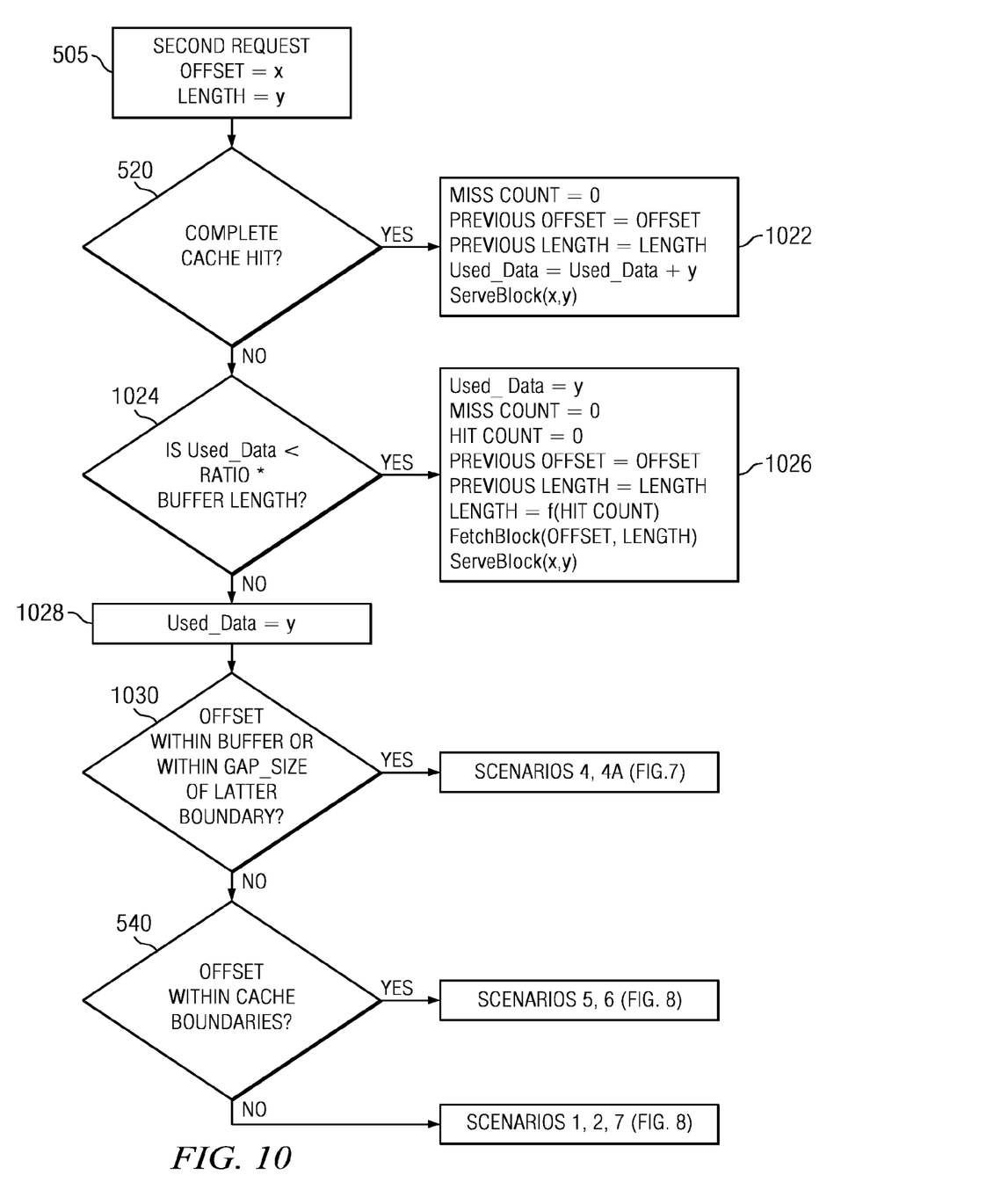
FIG. 10 is another flowchart illustrating an adaptive pre-fetching process according to embodiments of the invention.

FIG. 10 is another flowchart illustrating an adaptive pre-fetching process according to embodiments of the invention. FIG. 10 is a modified form of the flowchart of FIG. 5 to include the GAP_SIZE variable and the Used_Data counter. After operation 520's determination as to whether there is a complete cache hit, if that is the case, then after setting Miss Count=0, Previous Offset=Offset, and Previous Length=Length, operation 1022 may set counter Used_Data=Used_Data+y, the length of the current requested data block, and then may serve the requested data block from the buffer.

If there is not a complete cache hit in operation 520, a new condition may be tested in operation 1024 as to whether the counter Used_Data is less than the quantity (Ratio*buffer length), where Ratio is a predetermined constant less than or equal to 1, as mentioned above. If the inequality is satisfied, operation 1026 may perform a number of tasks, such as setting Used_Data=y, Miss Count=0, Hit Count=0, Previous Offset=Offset, Previous Length=Length, Length=f(Hit Count), FetchBlock(Offset, Length), and ServeBlock(x,y), all of which have been previously described.

If the inequality is not satisfied in operation 1024, Used_Data may be set to y in operation 1028. Operation 1030 acts like operation 530, but may also determine whether the offset of the second requested data block is within the distance GAP_SIZE from the latter boundary of pre-fetch buffer 245. If the condition in operation 1030 is satisfied, then the process continues as before to handle scenarios 4 or 4A. If the condition in operation 1030 is not satisfied, then the process continues as before to operation 540 to check whether the offset of the second requested data block is within the cache boundaries.

As with flowcharts in FIGS. 3 and 5-8, in the flowchart in FIG. 10, other operations or series of operations may be used, and the actual order of the operations in the flowcharts may not be critical.

This description assumed min_block_size was greater than or equal to the maximum request length the operating system would make. In the more general case, the process may check on each request to determine whether the request length is greater than f(Hit Count). If so, the process may adjust the Hit Count so that f(Hit Count) is greater than or equal to the request length. In that case, the instances of Length=f(Hit Count) may become Length=MAX_ADJUST(f(Hit Count), y), including operation 760 which may become MAX_ADJUST(f(Hit Count), y)−(buffer offset+buffer length−Offset). MAX_ADJUST is a function that may return the maximum value within f(Hit Count) and y, and in case y is actually greater, may adjust Hit Count so that f(Hit Count) is greater than or equal to y, but f(Hit Count−1) is less than y.

Embodiments of the invention may include an article such as a computer or processor readable medium, or a computer or processor storage medium, such as, for example, a RAM module, a mechanical disk drive, or a solid-state drive encoding, including, or storing instructions that, when executed by a processor or controller, carry out methods and processes disclosed herein. Such embodiments may also be delivered and/or transferred to a computer via a network such as the Internet.

Thus, disclosed herein are embodiments of methods that may be used in mounting a volume or operating a client's storage device. Contiguous data blocks larger than or the same length as those requested may be pre-fetched and stored in a buffer/cache in order to improve mount times and file transfer throughput across a channel. If, however, actual requested data blocks do not fall within the buffer/cache, the length and/or offset of those pre-fetched data blocks may be modified so as to result in more requested data blocks falling within the buffer/cache. Improved performance for mounting a volume has exceeded 35-fold, and file transfer throughput has improved by up to 5-fold using some embodiments of the invention.

While the invention has been described with respect to a limited number of embodiments, it will be appreciated that many variations, modifications, and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spiritof the invention.

The invention claimed is:

1. A method comprising:
   receiving a request for a first data block, including an indication of a length of the first data block;
   in response to receiving the request fetching a first pre-fetched data block having a first length greater than the length of the requested first data block;
   storing said first pre-fetched data block in a cache;
   receiving a subsequent request for a second data block, including an indication of a length of the second data block; and
   when data in the requested second data block is not stored within a valid part of said cache, in response to receiving the subsequent request, fetching a second pre-fetched data block having a second length greater than the length of the requested second data block, wherein the second length is different than said first length, said requested second data block having an offset, and
   when the offset of said requested second data block is not in said valid part of said cache, in response to receiving the subsequent request fetching a second pre-fetched data block having a second length smaller than said first length,
   wherein the first and second pre-fetched data blocks are associated with a storage device over a channel.

2. The method of claim 1, wherein said channel comprises a network.

3. The method of claim 1, wherein said second length equals said first length.

4. The method of claim 1, wherein said first and second pre-fetched data blocks have offsets, and the offset of said second pre-fetched data block is different from the offset of said first pre-fetched data block.

5. The method of claim 1, wherein if the offset of said requested second block is within said valid part of said cache or at the boundary of said valid part of said cache, and data in said requested second data block does not fall within said valid part of said cache, then said second length is greater than said first length.

6. The method of claim 1, wherein if the offset of said requested second block is within said valid part of said cache, at the boundary of said valid part of said cache, or within a predetermined length outside of said valid part of said cache, and data in said requested second data block does not fall within said valid part of said cache, then said second length is greater than said first length.

7. The method of claim 1, wherein if the offset of said requested second block is not in said valid part of said cache, then said second length is reset to a minimum data block length smaller than said first length.

8. The method of claim 1, wherein said method is for mounting a volume related to the storage device.

9. The method of claim 1, wherein said method is for accessing data from the storage device.

10. A system comprising:
    a computer in communication with a storage device over a channel;
    a driver within said computer receiving a request for a first data block, including an indication of a length of the first data block and in response to receiving the request fetching a first pre-fetched data block having a first length greater than the length of the requested first data block; and
    a cache within said computer for storing said first pre-fetched data block,
    the driver is to further receive a subsequent request for a second data block, including an indication of a length of the second data block and wherein when data in the requested second data block is not stored within a valid part of said cache, in response to receiving the subsequent request, the driver fetches a second pre-fetched data block having a second length greater than the length of the requested second data block, wherein the second length is different than said first length, said requested second data block having an offset, and when the offset of said requested second data block is not in said valid part of said cache, in response to receiving the subsequent request fetching a second pre-fetched data block having a second length smaller than said first length.

11. The system of claim 10, wherein said storage device is associated with a second computer.

12. The system of claim 10, wherein said channel is an out-of-band management channel.

13. The system of claim 12, wherein said channel communicates with a management engine.

14. The system of claim 10, wherein said channel is an in-band channel.

15. The system of claim 10, wherein said second length is less than or equal to a maximum data block length.

16. A computer memory tangibly embodying computer executable instructions therein, to be executed by a computer, for:
    receiving a request for a first data block, including an indication of a length of the first data block;
    in response to receiving the request fetching a first pre-fetched data block having a first length greater than the length of the requested first data block; storing said first pre-fetched data block in a cache;
    receiving a subsequent request for a second data block, including an indication of a length of the second data block; and
    when data in the requested second data block is not stored within a valid part of said cache, in response to receiving the subsequent request, fetching a second pre-fetched data block having a second length greater than the length of the requested second data block, wherein the second length is different than said first length, said requested second data block having an offset, and
    when the offset of said requested second data block is not in said valid part of said cache, in response to receiving the subsequent request fetching a second pre-fetched data block having a second length smaller than said first length,
    wherein the first and second pre-fetched data blocks are associated with a storage device over a channel.

17. The computer memory of claim 16, wherein said computer performs remote management services.

18. The computer memory of claim 16, wherein said instructions are for mounting a volume related to the storage device.

19. The computer memory of claim 16, wherein said instructions are for accessing data from the storage device.

* * * * *